(12) United States Patent
Hughes et al.

(10) Patent No.: US 7,801,484 B2
(45) Date of Patent: Sep. 21, 2010

(54) WIRELESS COMMUNICATIONS MODULE

(75) Inventors: Robert D. Hughes, Tualatin, OR (US);
Mark S. Kaminski, Birkenfeld, OR (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 10/957,352

(22) Filed: Sep. 30, 2004

(65) Prior Publication Data

US 2006/0057962 A1  Mar. 16, 2006

(51) Int. Cl.
*H04B 7/00* (2006.01)
(52) U.S. Cl. ........... 455/41.2; 455/127.4; 455/552.1; 455/553.1; 710/305; 710/313
(58) Field of Classification Search ........... 455/41.2, 455/73, 78, 556.1, 557, 558, 127.4, 552.1, 455/553.1; 710/106, 305, 313, 315
See application file for complete search history.

(56) References Cited

U.S. PATENT DOCUMENTS

| | | | | |
|---|---|---|---|---|
| 6,946,817 | B2 * | 9/2005 | Fischer et al. | 320/132 |
| 7,024,567 | B2 * | 4/2006 | Kim et al. | 713/300 |
| 2001/0051530 | A1 * | 12/2001 | Shiotsu et al. | 455/522 |
| 2003/0148788 | A1 * | 8/2003 | Kwak | 455/557 |
| 2004/0192222 | A1 * | 9/2004 | Vaisanen et al. | 455/78 |

* cited by examiner

*Primary Examiner*—Tuan H Nguyen
(74) *Attorney, Agent, or Firm*—Blakely, Sokoloff, Taylor & Zafman LLP

(57) ABSTRACT

An electronic system having a wireless peripheral module and a wireless network transceiver may include an interface that includes one or more co-existence signal lines that may allow coordination of wireless transmission between the wireless peripheral module and the wireless network transceiver.

12 Claims, 3 Drawing Sheets

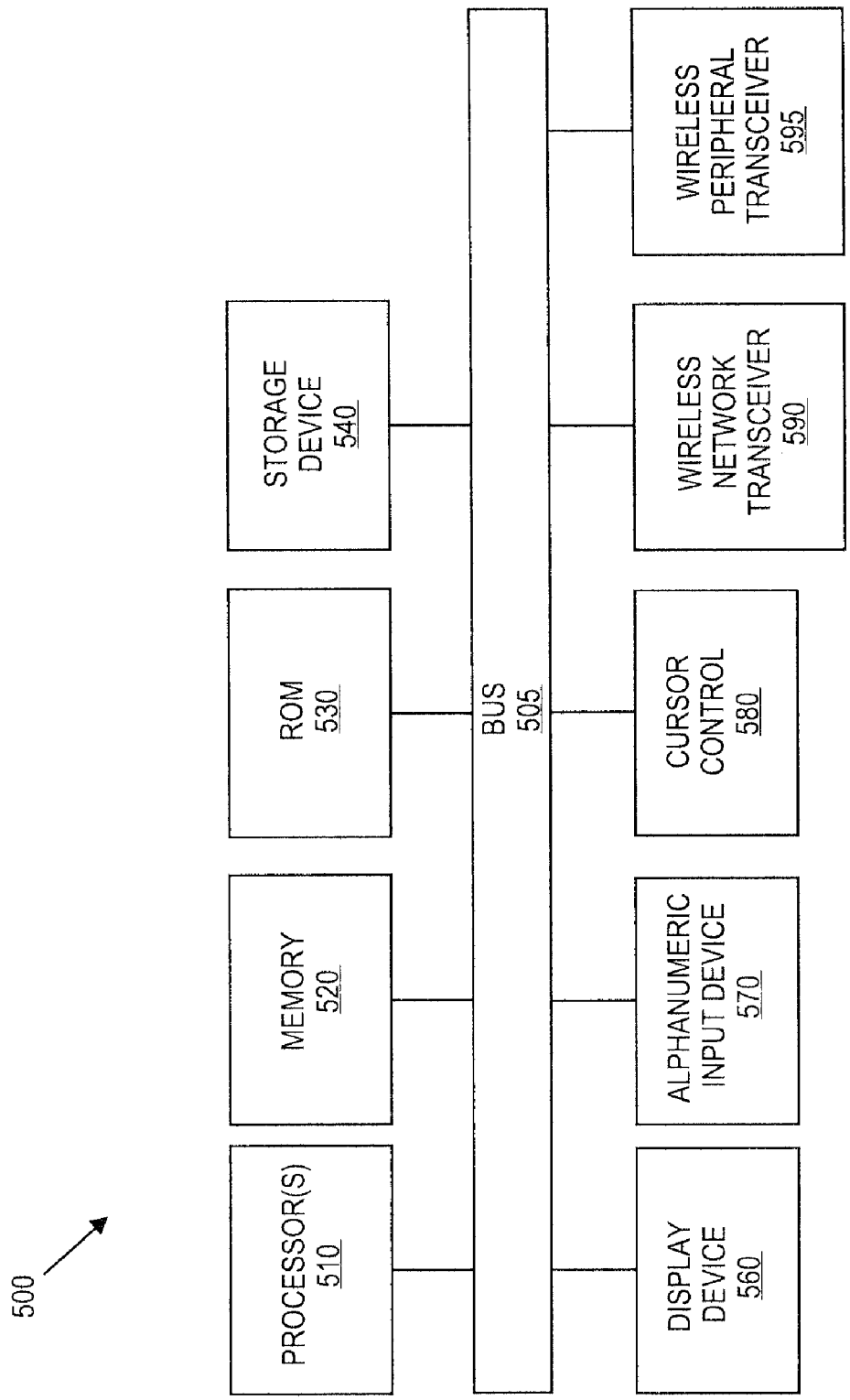

WIRELESS COMMUNICATIONS MODULE

TECHNICAL FIELD

Embodiments of the invention relate to integration of wireless communication modules within electronic systems. More particularly, embodiments of the invention relate to integration of a Bluetooth communication module within an electronic system having wireless network communication capabilities.

BACKGROUND

Traditionally, electronic device peripheral components (e.g., keyboards) have been connected to the electronic device via a cable. The specific details of the cables (e.g., type of connector, number of wires) has been dependent upon the components to be connected and often industry standards. A relatively recent development for connection of peripheral devices is the use of wireless protocols. Several protocols have been developed (e.g., Bluetooth) for relatively short-range applications such as communication between a computer system and one or more peripheral devices. Bluetooth protocols are described in "Specification of the Bluetooth System: Core, Version 1.2," published October 2003 by the Bluetooth Special Interest Group, Inc.

Integration of Bluetooth and other wireless modules can present multiple challenges for desktop system designers and integrators. Challenges range from worldwide regulatory requirements, to problematic issues with mounting the module including cost effective integration of the antenna while ensuring sufficient performance. Current Bluetooth solutions typically include attaching a Bluetooth dongle to an external Universal Serial Bus (USB) port. However, this solution falls short in several ways including cost, lack of integration and ability to coexist with wireless network communications such as IEEE 802.11b/g.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 is a block diagram of one embodiment of an electronic system.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are configurations that allow a wireless peripheral module (e.g., Bluetooth, IEEE 802.15 wireless personal area network (WPAN), any relatively low-power and/or short-range radio protocol) to be mounted, for example, at the rear of a computer system near or protruding through a radiation shield. IEEE 802.15 corresponds to IEEE Std. 802.15.1-2002 entitled "Wireless MAC and PHY Specifications for Wireless Personal Area Networks (WPANs™)," approved Mar. 1, 2002 as well as related documents. IEEE 802.15 is compatible with Bluetooth standard 1.1.

One common use for wireless peripheral modules is for Human Interface Devices (HID) such as a wireless mouse or a wireless keyboard. Because legacy free systems are becoming more popular and PS\2 connections on electronic device mainboards are becoming less common, the location of the PS\2 connectors is one option for a wireless replacement for keyboard and/or mouse connections. This may be a cost effective and integrated solution that could be socketed and populated according to order with either a PS\2 connection or a Bluetooth module. This may be a replacement for external USB wireless peripheral dongles requiring relatively little effort on behalf of the manufacturers to implement during factory builds.

Because this wireless peripheral module may be integrated into the system, additional hardware pins allow communication with an installed wireless local area network (WLAN) interface (e.g., IEEE 802.11b or IEEE 802.11g) to ensure that wireless peripheral and wireless network communications do not take place on the same channels at the same time. In one embodiment, integrated WLAN antennas of a system may be located towards the front of the system and the wireless peripheral module/antenna may be located towards the rear for increased isolation and reduced interference.

In one embodiment, a wireless peripheral module (e.g., Bluetooth) may be integrated (e.g., via connection to a slot on a system board) within an electronic system that includes a wireless network transceiver (e.g., IEEE 802.11b/g). The wireless peripheral module interface may include one or more communication lines that may be used for coordination of transmission between the wireless peripheral module and the wireless network transceiver. In one embodiment, an antenna for the wireless peripheral module may be configured to protrude through an EMI/ESD shield that is part of an electronic device enclosure. While many of the examples provided herein are described in terms of Bluetooth protocols, any relatively low-power and/or short-range wireless protocols may be supported.

Figure 1:
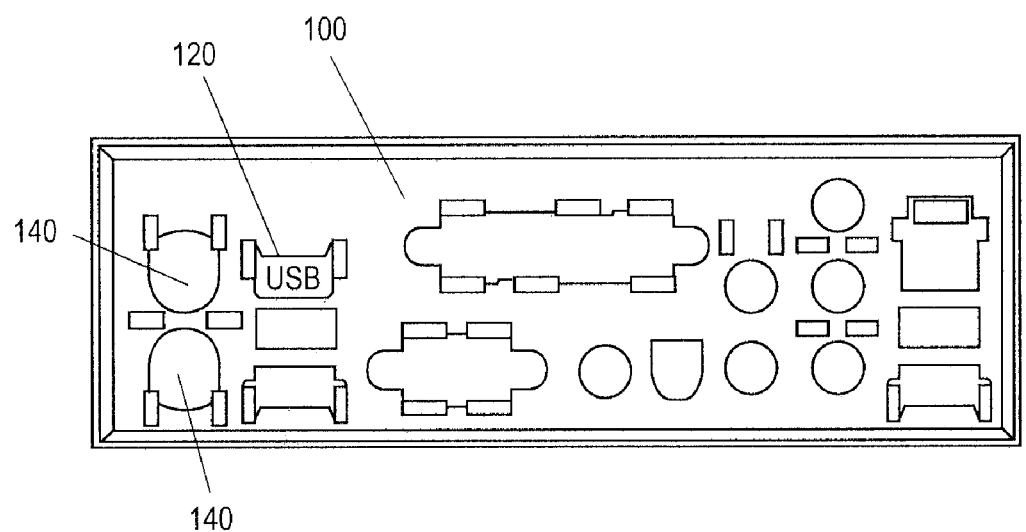
FIG. 1 illustrates one embodiment of an EMI/ESD shield having PS\2 ports that may be used with an electronic device enclosure.

FIG. 1 illustrates one embodiment of an EMI/ESD shield having PS\2 ports that may be used with an electronic device enclosure. The shield of FIG. 1 is typical of a shield that may be used with a desktop computer system; however, other shield configurations may be used.

In one embodiment, shield 100 may have holes for various ports that may be included in an enclosed electronic system. The ports may include, for example, Universal Serial Bus (USB) ports 120 and PS\2 ports 140. PS\2 ports 140 may be used for connectors to a keyboard and/or a mouse. USB ports 120 may be used for connecting a Bluetooth module to the electronic system. However, when the Bluetooth module is connected via one of USB ports 120, the Bluetooth module may cause interference with a wireless network transceiver that may use the same frequency band.

For example, both Bluetooth and IEEE 802.11b/g protocols operate in the 2.4 GHz range. Bluetooth protocols may use 79 channels spaced by 1 MHz and may use 1600 hops per second. IEEE 802.11b/g protocols may use channels having a different frequency spacing than the Bluetooth channels. Thus, as the Bluetooth module performs frequency hopping, one or more of the channels used by the Bluetooth module may interfere with a channel used by and IEEE 802.11b/g transceiver. Other devices may have similar interference problems.

Figure 2:
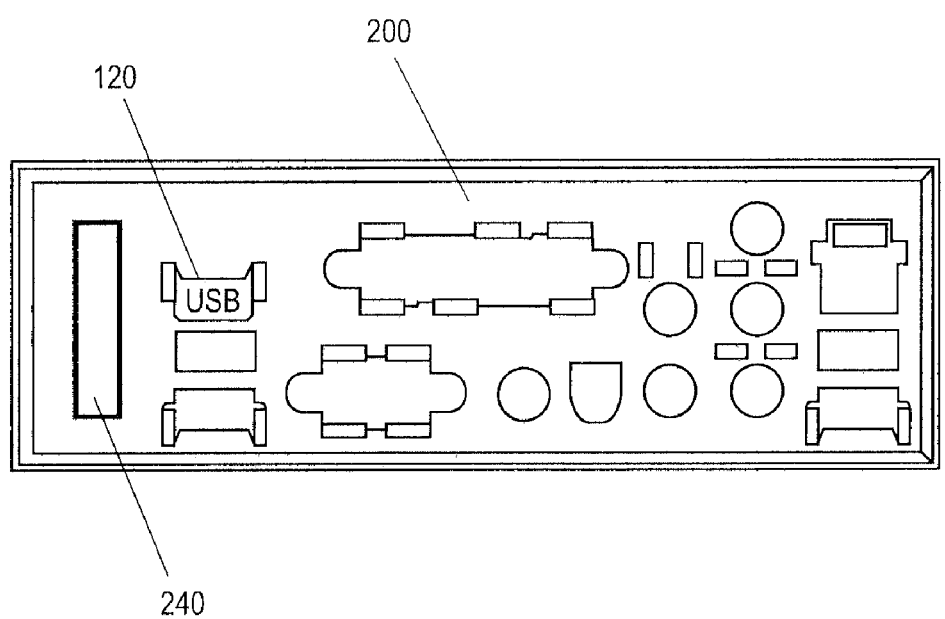
FIG. 2 illustrates one embodiment of an EMI/ESD shield having a hole for a wireless peripheral module antenna that may be used with an electronic device enclosure.

FIG. 2 illustrates one embodiment of an EMI/ESD shield having a hole for a wireless peripheral module antenna that may be used with an electronic device enclosure. The shield of FIG. 2 may be, for example, a shield for an electronic device that may have an integrated wireless peripheral module with an antenna that protrudes through the shield.

In one embodiment, shield 200 may have holes for USB ports 120 and a hole for a wireless peripheral module antenna 240. In one embodiment the wireless peripheral module may replace one or more PS\2 ports. Thus, in a system having an integrated wireless peripheral module, one or more PS\2 ports for use in connecting wired peripheral devices to the electronic system may be unnecessary.

In one embodiment, when the wireless peripheral module is inserted in a slot on a mainboard of a host electronic system. When the wireless peripheral module is placed in the slot, an antenna may protrude through a hole in shield 200. When the antenna protrudes through the slot signals may be transmitted and received via the antenna to allow the wireless peripheral module to communicate with one or more peripheral devices.

Figure 3:
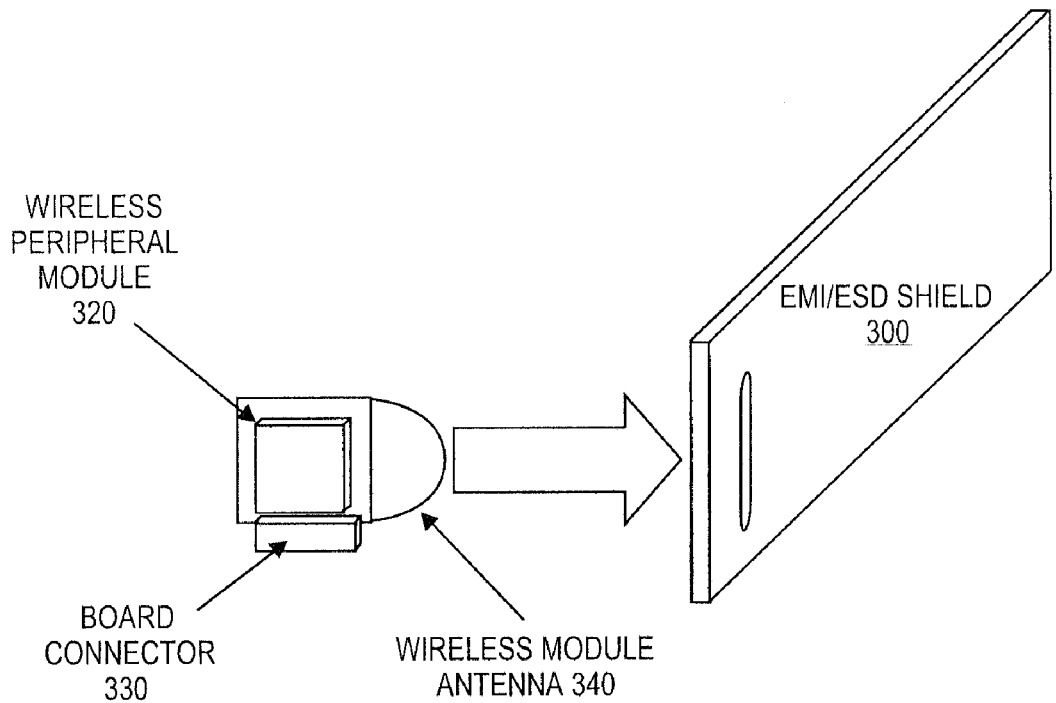
FIG. 3 is a block diagram of one embodiment of a wireless peripheral module to be inserted in a slot on a board and a radiation shield.

FIG. 3 is a block diagram of one embodiment of a wireless peripheral module to be inserted in a slot on a board and a radiation shield. In one embodiment, wireless peripheral module 320 may be inserted in board connector 330, which provides an electrical connection that may allow wireless peripheral module 320 to communicate with one or more components within an electronic system. In one embodiment, board connector 330 may include an electrical interface described with respect to FIG. 4. Other electrical interfaces may also be used. In one embodiment, wireless module antenna may protrude through a slot in radiation shield 300.

Figure 4:
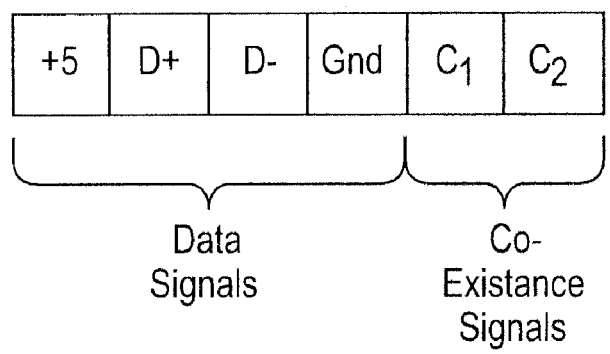
FIG. 4 is a signal diagram of one embodiment of an electrical interface that may be used with a wireless peripheral module.

FIG. 4 is a signal diagram of one embodiment of an electrical interface that may be used with a wireless peripheral module. The example interface of FIG. 4 includes two signal lines that may be used to coordinate transmissions between the wireless peripheral module and a wireless network transceiver. In other embodiments, a different number of signal lines (e.g., 3) may be used.

In one embodiment, the interface may include four data signal lines that may correspond to a USB interface. The data signal lines may correspond to a 5 Volt power supply (+5), a ground (GND), and two differential signal lines (D+, D−) to communicate a data signal. The electrical interface may further include two co-existence signal lines ($C_1$, $C_2$). The co-existence signal lines may provide signals that may be used by a wireless network transceiver, by a wireless network interface, wireless peripheral module, or a wireless peripheral interface to coordinate wireless communications between the wireless peripheral module and the wireless network transceiver in a manner that may reduce interference and/or transmission collisions.

In one embodiment, a wireless peripheral module may transmit and receive signals to and from one or more peripheral devices using a wireless protocol, for example, Bluetooth. The electrical signals that correspond to the wireless communications may be carried to and from the wireless peripheral module via the data signals illustrated in FIG. 4.

In one embodiment, the wireless peripheral module may receive from the wireless network transceiver or other associated device, a data signal and a priority signal, which are illustrated as co-existence signals in FIG. 4. The co-existence signals may be used to indicate to the wireless peripheral module a channel to be used by the wireless network transceiver and/or a time period for use of the channel. In response, the wireless peripheral module may avoid transmission using the channel during the time that the wireless network transceiver is using the channel.

For example, using a Bluetooth protocol, when performing channel hopping, the wireless peripheral module may avoid using Bluetooth channels that interfere with a channel used by the wireless network transceiver. Because the channel spacing used by the wireless peripheral module may be different than the channel spacing used by the wireless network transceiver, the wireless peripheral module may avoid using multiple channels that may interfere with a channel used by the wireless network transceiver.

Because the co-existence signals are used to communicate between the wireless peripheral module and the wireless network transceiver, transmission interference may be reduced. Also, sensing techniques that may be used to determine available frequencies may be eliminated because the specific frequencies used and the timing of the use may be communicated between the wireless network transceiver and the wireless peripheral module. Because the wireless peripheral module interface includes both data signals and co-existence signals, a single, simplified interface may be provided, which may reduce the cost and complexity of the host electronic system.

FIG. 5 is a block diagram of one embodiment of an electronic system. The electronic system illustrated in FIG. 5 is intended to represent a range of electronic systems. Alternative electronic systems can include more, fewer and/or different components.

Electronic system 500 includes bus 505 or other communication device to communicate information, and processor 510 coupled to bus 505 to process information. While electronic system 500 is illustrated with a single processor, electronic system 500 can include multiple processors and/or co-processors as well as different bus arrangements. Electronic system 500 further includes random access memory (RAM) or other dynamic storage device 520 (referred to as memory), coupled to bus 505 to store information and instructions to be executed by processor 510. Main memory 520 also can be used to store temporary variables or other intermediate information during execution of instructions by processor 510.

Electronic system 500 also includes read only memory (ROM) and/or other static storage device 530 coupled to bus 505 to store static information and instructions for processor 510. Data storage device 540 is coupled to bus 505 to store information and instructions. Data storage device 540 such as a magnetic disk or optical disc and corresponding drive can be coupled to electronic system 500.

Electronic system 500 can also be coupled via bus 505 to display device 560, such as a cathode ray tube (CRT) or liquid crystal display (LCD), to display information to a user. Alphanumeric input device 570, including alphanumeric and other keys, is typically coupled to bus 505 to communicate information and command selections to processor 510. Another type of user input device is cursor control 580, such as a mouse, a trackball, or cursor direction keys to communicate direction information and command selections to processor 510 and to control cursor movement on display 560. The peripheral devices of electronic system 500, for example, alphanumeric input device 570 and/or cursor control 580 may be coupled with bus 505 via wireless peripheral transceiver 595, which may be, for example, a Bluetooth transceiver. Any protocol known in the art for wireless peripheral communications may be used. Electronic system 500 further includes wireless network transceiver 590 to provide access to a network, such as a local area network.

Instructions are provided to memory from a storage device, such as magnetic disk, a read-only memory (ROM) integrated circuit, CD-ROM, DVD, via a remote connection (e.g., over a network via wireless network transceiver 590) that is either wired or wireless, etc. In alternative embodiments, hardwired circuitry can be used in place of or in combination with software instructions. Thus, execution of sequences of instructions is not limited to any specific combination of hardware circuitry and software instructions.

An electronically-accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    a wireless network transceiver to provide wireless network connectivity for an electronic device using a wireless network protocol;
    a wireless peripheral transceiver to provide wireless connectivity between the electronic device and one or more peripheral devices; and
    an electrical interface coupled with the wireless peripheral transceiver having a Universal Serial Bus (USB)-compliant electrical interface and two or more data signal lines to carry signals corresponding to operation of the one or more peripheral devices between the wireless peripheral transceiver and one or more components of the electronic device and one or more co-existence signal lines to carry signals corresponding to transmission characteristics of the wireless network transceiver to the wireless peripheral transceiver, wherein the co-existence signals indicate to the wireless peripheral transceiver a channel to be used by the wireless network transceiver and a time period for use of the channel wherein the electrical interface is a six-line interface that comprises four USB-compliant data signal lines and two co-existence signal lines to carry data corresponding to at least a channel used by the wireless network transceiver.

2. The apparatus of claim 1 wherein the wireless peripheral transceiver operates according to a Bluetooth protocol.

3. The apparatus of claim 2 wherein the wireless network transceiver operates according to an IEEE 802.11 protocol.

4. The apparatus of claim 1 wherein the wireless peripheral transceiver operates according to an IEEE 802.15 protocol.

5. The apparatus of claim 1 wherein the electrical interface further comprises a third co-existence signal line to carry data corresponding to at least a channel used by the wireless network transceiver.

6. The apparatus of claim 1 wherein the electrical interface comprises a connector coupled with a circuit board of the electrical device to receive the wireless peripheral module.

7. The apparatus of claim 6 wherein the connector is positioned such that when the wireless peripheral module is coupled with the connector, an antenna of the wireless peripheral module protrudes through a radiation shield of the electronic system.

8. A method comprising:
    determining a frequency range to be used by a wireless network transceiver to provide connectivity for an electronic device using a wireless network protocol; communicating, via a Universal Serial Bus (USB)-compliant electrical interface having at least two lines in addition to USB-compliant lines to communicate co-existence information, the frequency range to be used by the wireless network transceiver to a wireless peripheral module coupled with the electrical interface, the wireless peripheral module to provide connectivity between the electronic device and one or more peripheral devices wherein the electrical interface is a six-line interface that includes four USB-compliant data signal lines for a high reference voltage level, a low reference voltage level, and a pair of lines for a differential data signal and two co-existence signal lines to carry data corresponding to at least a channel used by the wireless network transceiver; and
    transmitting signals to one or more peripherals with the wireless peripheral module using one or more channels selected based on the co-existence information to not overlap the frequency range to be used by the wireless network transceiver, wherein the co-existence information indicates to the wireless peripheral transceiver a channel to be used by the wireless network transceiver and a time period for use of the channel.

9. The method of claim 8 wherein the wireless network transceiver operates according to an IEEE 802.11 protocol.

10. The method of claim 8 wherein the wireless peripheral transceiver operates according to a Bluetooth protocol.

11. The method of claim 8 wherein the wireless peripheral transceiver operates according to an IEEE 802.15 protocol.

12. The method of claim 8 wherein the electrical interface comprises a seven-line interface that includes four data signal lines for a high reference voltage level, a low reference voltage level, and a pair of lines for a differential data signal and three co-existence signal lines to carry data corresponding to at least a channel used by the wireless network transceiver.

* * * * *